US009359677B2

(12) United States Patent
Mackenzie et al.

(10) Patent No.: US 9,359,677 B2
(45) Date of Patent: Jun. 7, 2016

(54) METHOD FOR INHIBITING CORROSION

(75) Inventors: Cameron Mackenzie, Glasgow (GB); Vjera Magdalenic, Edinburgh (GB); Artin Moussavi, Edinburgh (GB); Michael Joosten, Bartlesville, OK (US); Mohsen Achour, Bartlesville, OK (US); David J. Blumer, Bartlesville, OK (US)

(73) Assignee: Lux Assure Limited, Edinburgh (GB)

( * ) Notice: Subject to any disclaimer, the term of this patent is extended or adjusted under 35 U.S.C. 154(b) by 0 days.

(21) Appl. No.: 13/003,946

(22) PCT Filed: Jul. 20, 2009

(86) PCT No.: PCT/GB2009/001803

§ 371 (c)(1), (2), (4) Date: Mar. 10, 2011

(87) PCT Pub. No.: WO2010/007397

PCT Pub. Date: Jan. 21, 2010

(65) Prior Publication Data

US 2011/0193027 A1 Aug. 11, 2011

(30) Foreign Application Priority Data

Jul. 18, 2008 (GB) .................................. 0813278.9

(51) Int. Cl.

| | |
|---|---|
| ***C23F 11/08*** | (2006.01) |
| ***C23F 11/00*** | (2006.01) |
| ***C09K 8/54*** | (2006.01) |
| ***C23F 11/10*** | (2006.01) |

(52) U.S. Cl.

CPC . *C23F 11/00* (2013.01); *C09K 8/54* (2013.01); *C23F 11/10* (2013.01)

(58) Field of Classification Search

CPC ...................................................... C23F 11/08
USPC ........................................................ 252/387
See application file for complete search history.

(56) References Cited

U.S. PATENT DOCUMENTS

| | | | | |
|---|---|---|---|---|
| 4,783,314 | A | 11/1988 | Hoots et al. | |
| 4,882,075 | A | 11/1989 | Jones | |
| 5,691,809 | A | 11/1997 | Tackett et al. | |
| 6,194,216 | B1 | 2/2001 | Walker et al. | |
| 6,315,955 | B1 * | 11/2001 | Klein | 422/73 |
| 6,521,185 | B1 | 2/2003 | Groger et al. | |
| 2003/0141258 | A1 | 7/2003 | Hatch | |
| 2004/0098202 | A1 | 5/2004 | McNeil et al. | |
| 2005/0037509 | A1 | 2/2005 | Geisler et al. | |
| 2005/0263290 | A1 * | 12/2005 | Zazovsky et al. | 166/378 |

FOREIGN PATENT DOCUMENTS

| | | | |
|---|---|---|---|
| EP | 0566902 | A1 | 10/1993 |
| JP | 2006083247 | A | 3/2006 |
| WO | 03018709 | A1 | 3/2003 |
| WO | 2005116173 | A1 | 8/2005 |
| WO | 2010007390 | A2 | 1/2010 |

OTHER PUBLICATIONS

Oliveira M E C D R et al., "Solvatochromic Fluorescent Probes in Bicontinuous Microemulsions," Journal of Molecular Structure, Elsevier, Amsterdam, NL, vol. 563-564, May 28, 2001, pp. 443-447, XP007910443.

International Search Report in PCT/GB2009/001803, 2010.

John, D. et al, "The Application of Neutron Reflectometry and Atomic Force Microscopy in the Study of Corrosion Inhibitor Films," Physica B 385-386 (2006) pp. 924-926.

Moon, T. et al., "Relating Corrosion Inhibitor Surface Active Properties to Field Performance Requirements," Corrosion 2002, NACE The Corrosion Society (2002), Paper No. 02298 ).

Atia, A. A. et al., Inhibition of Acid Corrosion of Steel Using Cetylpyridinium Chloride, Journal of Applied Electrochemistry 33 (2003) pp. 171-177.

Jovancicevic, V. et al, Inhibition of Carbon Dioxide Corrosion of Mild Steel by Imidazoles and their Precursors, Corrosion, 55, No. 5 (1999) pp. 449-455.

Shalaby, M. N. et al., Effect of Some Organic Surfactants on Corrosion Inhibition of Steel in Sea Water, Anti-Corrosion Methods and Materials, 46, No. 4 (1999), pp. 254-260.

Liu, Q. et al, "Development, Evaluation, and Field Performance of Combined Corrosion Inhibitor," NACE International Corrosion 2013 Conference and Expo (2013), paper 2233.

Knag et al., "A quartz crystal microbalance study of the adsorption of quaternary ammonium derivates on iron and cemetite" Colloids and Surfaces A: Physiochem. Eng. Aspects 250 (2004) pp. 269-278.

Swidzinski et al., "Corrosion inhibition of wet gas pipelines under High Gas and Liquid Velocites," Corrosion 2000 (2000), paper 00070.

Mackenzie, C. et al., :Flow Loop Trial of Corrosion Inhibitor Dose Optimisation by Micelle Detection, Corrosion, 2012-0001289, Mar. 11-15, 2012. Salt Lake City, Utah, USA.

Weisstuch, A., et al., "Micellization and Cooling Water Corrosion Inhibition," Materials Protection and Performance, 1971, 29-32, vol. 10, No. 12.

Australian Patent Examination Report No. 1—Australian Application No. 2009272395, May 19, 2014, pp. 1-4, Melbourne, Australia.

* cited by examiner

*Primary Examiner* — Peter F Godenschwager

(74) *Attorney, Agent, or Firm* — Ostranger Chong Flaherty & Broitman P.C.

(57) ABSTRACT

A method for inhibiting corrosion comprises the steps of providing a fluid; adding a corrosion inhibitor comprising at least one amphiphilic chemical to the fluid; and monitoring micelles presence in the fluid. A method for determining the amount of corrosion inhibitor that is sufficient to inhibit corrosion, a method for monitoring the activity of an amphiphilic chemical and a system for inhibiting corrosion in a conduit are also disclosed.

22 Claims, 11 Drawing Sheets

METHOD FOR INHIBITING CORROSION

CROSS-REFERENCE TO RELATED APPLICATIONS

This application is the U.S. National Stage of International Application No. PCT/GB2009/001803, filed Jul. 20, 2009, which claims priority to British Application No. 0813278.9, filed Jul. 18, 2008.

FIELD OF THE INVENTION

The application relates to a method for inhibiting corrosion and to a method for monitoring the effective concentration of corrosion inhibitor in a fluid. The invention is based on the use of micelle formation as an indicator of effective corrosion inhibitor concentration.

BACKGROUND OF THE INVENTION

In the oil and gas industry and in the petrochemical industry, fluids are commonly transported and processed in metal pipes and conduits, typically made of steel. These pipes and conduits carry fluids containing amounts of oil and/or water and are also likely to contain hydrocarbon or other gases and solids. The solids can arise from the rock formation or due to the presence of in situ chemical deposits (e.g. scale, wax) or corrosion by-products or due to precipitation of previously dissolved species due to a change in the physical or chemical environment. A typical length of pipe used in the oil industry is likely to contain all of these compounds in various amounts over its lifetime.

Water produced in the extraction of oil is typically acidic, especially in the presence of carbon dioxide and/or hydrogen sulphide which are often present during the extraction process. Bacteria found in industrial environments, particularly sulphate-reducing bacteria, can initiate or accelerate the corrosion in these systems. In addition, stimulation of wells may involve the injection of chemical products. For example, acid-based liquids may be introduced in the well during drilling or recovery operations. These acidic compounds can be extremely corrosive and corrosion inhibitors may be added to the fluids that come into contact with metallic surfaces. These corrosion inhibitors can either form a film protecting the metallic surface or reduce the corrosion process by means of physical and/or chemical reactions on metallic surfaces.

Organic corrosion inhibitors are the most commonly used corrosion inhibitors in use in oilfield systems and are also commonly used in oil and gas processing and petrochemical industries. The active ingredient is usually a detergent-like or surfactant molecule with a charged polar (i.e. water-soluble or hydrophilic) head group and an uncharged non-polar (i.e. oil-soluble or lipophilic) tail. When introduced into a pipe, these compounds rapidly partition to regions of polarity interfaces where the opposite electrostatic properties of each part of the molecule create least energetic repulsions. In practice, the molecules rapidly absorb to the surface of the pipe, which is highly charged, and form ordered two-dimensional structures on the surface thereby creating a protective film.

Surfaces requiring protection include pipes, conduits, tubes, and other metal fixtures and any component in regular contact with corrosive fluids. These pipes may be used in exploration, drilling, completion, production operations, refining, and/or transportation of produced fluids, products or intermediates. Corrosion inhibitors are also used in fields other than that of oil production, for example in water treatment systems, refineries, petrochemical, paper manufacturing and inhibitors may even be added to diesel to prevent corrosion from wet fuel.

Corrosion is a growing problem particularly for older oil wells, since the composition of produced fluids changes from predominantly hydrocarbons to hydrocarbon/brine mixtures to predominantly brine with lower hydrocarbon yields. The increasing value of petroleum products and the decreasing availability of new and easily extractable sources mean that the average age of producing wells is increasing and so the capacity for corrosion increases too. On average, it is estimated that three barrels of water are produced for every barrel of oil produced globally. Gas wells also suffer from increasing corrosion with age due to the increased exposure to corrosive environments. Deliberate transport of potentially corrosive fluids, such as carbon dioxide for carbon sequestration, and extraction of petroleum sources such as acid crude and highly sour gas condensates, is also becoming more common and is likely to increase further in the future.

Maintaining the amount of corrosion inhibitors at about an effective concentration is critical to maximising steel protection and minimising over use of chemicals. Inhibitor residuals provide close control of a system. The basis of any residual monitoring is that active corrosion inhibitors may be consumed in the inhibition process or lost due to deposit, corrosion and chemical degradation processes and combinations of such phenomena. The inhibitor may also be lost with the produced fluids for example when it is injected down a well and is then brought up within the oil and water. In this case, the inhibitor is then either disposed of with the water or passed through to the oil processing facilities.

Many methods for controlling the corrosion inhibitor concentration are based on knowing how much has been used and converting the amount into availability. Some techniques are also available to detect coverage of a steel surface with chemical.

Corrosion inhibitor formulations are complex chemical mixtures and difficult to monitor because of the large number of components involved. Few monitoring methods measure all components of a formulation. For example, a colourimetric approach may be used which is based on the detection of colour produced with the reaction of compounds with amines. However, this approach is limited to the monitoring of specific classes of chemicals. Alternatively, in the ion pair technique, an excess of a large anionic molecule is added to the water containing a cationic corrosion inhibitor. The ion pair formed is then extracted into a solvent and its concentration determined colourimetrically. A disadvantage of the ion pair technique is that the method is restricted to formulations with known chemical composition and needs to be tailored to the components of the composition. Another disadvantage is that the limit of detection of the ion pair technique is generally only about 5 ppm for inhibitor residuals.

Ultraviolet (UV) absorption methods that are based upon the measurement of the absorbance of UV light by a component of a corrosion inhibitor formulation may also be used. Fluorescence methods are also available, which methods use the fluorescence spectra or emission intensities of specific inhibitors. These methods are prone to error from other absorbent or fluorescent species.

Other techniques provide more information about the concentration of particular components in a fluid sample, such as ESI MS-MS (electro-spray ionisation tandem mass spectrometry). However, this method is time-consuming, uses expensive and bulky equipment that is not suitable for off-shore manipulation, and requires regular maintenance. ESI MS-MS systems must be handled by skilled technicians and do not normally provide quantitative information. Less sophisticated mass spectrometry variations can be used but they are less informative and are still complicated and laboratory based. In addition, mass spectrometry usually requires the chemical composition of the formulation to be known and the method must be modified and tailored to the components of the composition. However, chemical companies rarely release information on the exact components of their corrosion inhibitor formulation and service companies often bind operators to "non-analysis agreements" to specifically stop them from analysing their formulations for chemical composition. Interpretation of results can therefore be difficult.

Functional tests are available that monitor the severity of corrosion in a system rather than the amount of chemical used or left. For example, methods using linear polarization resistance, electrical resistance or weight loss may be used. However, these methods are specific to a particular location rather than the full conduit.

Corrosion coupons are also widely used and provide quantitative results at reasonable cost. Coupons of predetermined shape, size, surface area and with similar metallurgical properties to that of process equipment are inserted into the process stream and re-weighed and visually analysed after a set exposure period. Removal from the system and lab analysis is required to provide corrosion rate and measurements such as pitting and scaling. The information from the coupon is an additive effect of typically three months and so the temporal resolution of this monitoring system is very low. Further, although information on the corrosive capacity of a system is available, no direct information on levels of corrosion inhibitor residuals is provided. The coupon method provides evidence that corrosion has occurred and so only reactive corrective measures are possible.

Many of the techniques described above can only be used in aqueous systems and are unsuitable for fluids comprising larger amounts of oil. The specific abilities will be slightly different for each different technology. False increase or decrease in signal from interferences means levels have significant uncertainty. All the techniques are susceptible to interferences and oil components often need to be extracted from the water sample to be analysed. The extraction process can be time consuming and technically difficult. In addition, inhibitor may be lost during the extraction process.

There is therefore a need for a method for monitoring the concentration of corrosion inhibitor in a fluid. Most importantly, there is a need for a method that provides information on whether effective corrosion residual concentrations are present in the fluid. The method needs to be simple, rapid and applicable without the need for expensive equipment. The need for extractions must be minimised and the method should be performable offshore, for example, on an oil rig or other oil extraction or production site. The method needs to be independent of the particular chemical formulation of the corrosion inhibitor so that it can be widely applicable.

SUMMARY OF THE INVENTION

There is therefore provided a method for inhibiting the corrosion of surfaces requiring protection, including pipes, conduits, tubes, and other metal fixtures and component in regular contact with corrosive fluids. This method comprises the steps of providing a fluid; adding a corrosion inhibitor comprising at least one amphiphilic chemical to the fluid; and monitoring micelles presence in the fluid. Preferably, the corrosion inhibitor is added to the fluid until the presence of micelles is detected in the fluid. This method may also enable a user to monitor the corrosion of the surfaces requiring protection.

There is also provided a method for determining the amount of corrosion inhibitor that is sufficient to inhibit the corrosion of surfaces requiring protection. This method comprises the steps of adding a corrosion inhibitor comprising at least one amphiphilic chemical to a fluid and detecting micelles formation in the fluid.

There is also provided a method for monitoring the activity of an amphiphilic chemical, the method comprising the steps of adding at least one amphiphilic chemical to a fluid; and detecting micelle formation in the fluid.

Thus, due to the specific characteristics of micelles, these methods do not require detailed information on the chemical composition of the corrosion inhibitor formulations and the need for an extraction process is minimised. In addition to monitoring residuals in production, the improved method of corrosion inhibitor detection could be used for developing improved treatment chemicals.

Preferably, the amphiphilic chemical is an amphiphilic surfactant. The amphiphilic surfactant may be anionic, cationic, non-ionic or amphoteric. The surfactant may be selected from imidazoline compounds, phosphonate compounds, alkyl pyridine compounds, quaternary amine compounds, ethoxylated amine compounds, amide compounds, propionate compounds, anhydride compounds (particularly succinic anhydride and maleic anhydride) and derivatives thereof. Indeed, amphiphilic surfactants comprise a hydrophilic part and a lipophilic part that are capable of self-aggregating to form micelles or reverse micelles. The naming convention for these compound families tends to describe the hydrophilic head group and the derivatives tend to be the lipophilic tails which are often straight chain or branched hydrocarbon which can be, but do not have to be, partly unsaturated. The charged head group can be cationic, anionic or amphoteric in nature.

The fluid may comprise one or more of water, oil, gas, liquefied gas and/or emulsions, and it may contain solids (suspended or precipitated). The effective concentration of the corrosion inhibitor is preferably monitored by monitoring the presence of micelles in water and/or the presence of reverse micelles in oil. Amphiphilic inhibitor molecules may aggregate with their hydrophilic part directed to the outer surface of the micelle and their lipophilic part directed inwards to form a micelle. This would be the case if the micelle formed in an aqueous environment. Alternatively, they may aggregate with their lipophilic part directed towards the outer surface of the micelle and their hydrophilic part directed inwards to form a so-called reverse micelle. This would be the case if the micelle formed in a relatively non-polar environment such as in oil. Therefore, a fluid comprising water and/or oil may be analysed using the present method for corrosion inhibition, without the need for an extraction step.

Micelles formation may be monitored using, optical means such as laser diffraction, interferometry or imaging, spectroscopic means, hyperspectral imaging or flow cytometry. The advantages of using these monitoring methods will be discussed in further detail below.

Preferably, a compound capable of associating with a micelle to produce an amplified signal may be added to the fluid to be analysed, thereby improving the limit of detection and/or the accuracy and precision of monitoring methods.

In the context of the invention, the term "amphiphilic" refers to the property of a molecule having a water-soluble polar head (hydrophilic) and a water-insoluble organic tail (hydrophobic). A "surfactant" is a compound that is surface active and reduces surface tension when dissolved in a liquid, or that reduces interfacial tension between two liquids or between a liquid and a solid.

BRIEF DESCRIPTION OF THE DRAWINGS

The invention will be further described with reference to the drawings and figures, in which.

DESCRIPTION OF PREFERRED EMBODIMENTS

Figure 1:
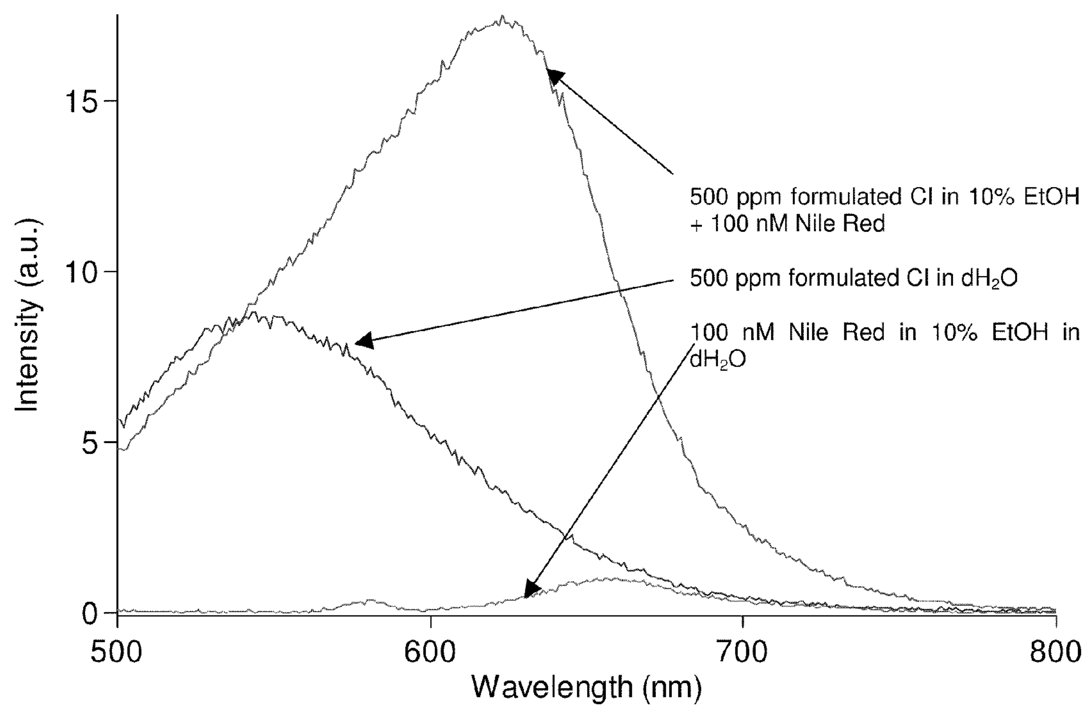
FIG. 1 shows fluorescence spectra of aqueous solutions of Nile Red with and without micelles.

The invention is based on the use of micelles as an indicator of effective corrosion inhibitor concentration. The corrosion inhibitor molecules naturally migrate to any interfaces between oil and water phases present in a fluid so that the electrostatic repulsions of both ends of the molecule are minimised. In a similar way, when a formulation comprising a corrosion inhibitor is introduced into for example a steel pipe through which a mixed oil-water fluid flows, the polar head group is strongly attracted to the charged surface of the steel pipe and spreads across the surface of the pipe and blocks access and corrosive attack from the water. If unable to migrate to the pipe surface, the molecules will partition across the oil-water interface, thereby decreasing the interfacial tension and enhancing the propensity of the system to form emulsions which must be broken down during the fluid processing. An additional site of attachment of these molecules is at solid surfaces that might be present due to formation fracturing, drilling or from natural minerals.

Once all of these surface sites are saturated with active components additional active molecules are geometrically prohibited from attaching to these favoured interfaces. Instead, the next most favoured environment is for the molecules to self-aggregate and internalise into micelles. At this point micelles form an emulsion and the increase in corrosion protection is minimal with further increase in inhibitor concentration. The essence of the present method is the observation of these mixed phase droplets that are evidence of total molecular coverage of the metal surface and therefore are evidence of optimum protection from chemical or electrochemical corrosion by the inhibitor. The fact that the presence of the droplets is inextricably linked to surface saturation and function circumvents the assumptions built into typical assays and is an important and innovative step forward in the corrosion management field.

Therefore, a corrosion inhibitor formulation may be added into the fluid to maximise the protection of the steel pipe. Once micelles are detected in the fluid, the addition of corrosion inhibitor can be optimised in order to minimise the overuse of the formulation whilst maintaining maximum protection. The monitoring of the effective corrosion inhibitor concentration has advantages with respect to flow assurance, asset integrity, environmental management and downstream processing. Indeed, such a method allows the inhibitor dosage to be accurately controlled and quickly corrected if necessary. Inhibitors tend to be toxic and pose an environmental hazard. However, with the present method, overuse of chemicals that can have deleterious effects on downstream process operations through oil in water, water in oil or solid dispersions is reduced and so is expenditure. These methods further provide an indicator of treatment programme performance and minimise the risk of loss of system integrity.

Preferred corrosion inhibitor component chemicals include, but are not limited to, imidazoline compounds, phosphonate compounds, alkyl pyridine compounds, quaternary amine compounds, ethoxylated amine compounds, amide compounds, propionate compounds, anhydride compounds (particularly succinic anhydride and maleic anhydride) and derivatives thereof. The inhibitors may be combined with additives. Additional components of the applied inhibitor mix may include co-solvents such as alcohols, which increase two-dimensional molecular packing density at the metal surface and which also allow the active components to be easily dispersed for application. Detergents may be added as part of the formulation to clean the surface and allow access of the active inhibitor to the surface.

A formulation comprising a corrosion inhibitor may be added to a fluid as one or more distinct batches or continuously. The fluid may be contained in for example a vessel, a container or a well or may flow through a pipe. A sample of fluid may be obtained from a static fluid in a container or fluid flowing out of a well or fluid being transported across land or sea. In the case of a fluid flowing through a pipe, a sample is preferably extracted downstream from the point of injection of the corrosion inhibitor so that the inhibitor travels some distance, thereby coating a length of pipe, prior to extraction. A secondary pipe from which a sample may be extracted can be arranged in fluid communication with the main pipe through which the fluid flows. Thus, the system needs not be disturbed each time an analysis is to be carried out.

The main advantage of monitoring micelles, as opposed to inhibitor residuals, is that micelles have specific physical and chemical properties which are discrete and different from the bulk fluid and from other particles (solid or liquid). These properties include size (generally 20 nm and larger), shape (spherical or rod-like depending on the nature of the surrounding fluid) and charge properties (highly charged surface or core for micelles and reverse-micelles respectively) that can be more readily analysed without the need for expensive molecular analysis.

In addition, corrosion inhibitors present in a fluid may be monitored in both water and oil phases. Detection may be carried out in the presence of interferences and extraction of an aqueous or oil sample is minimised together with the risk of loss of compound in an extraction process.

Furthermore, the present method relies on the formation of micelles and therefore no information is required on the specific chemical composition of the formulation. A single detection system will give consistent data across all different amphiphile formulations because no assumptions or manipulations are made based on chemical content.

Another advantage is that the method may be used for corrosion inhibitor concentrations normally used in oilfields, i.e. from 100 ppb to 1000 ppm.

Corrosion inhibitor micelles may be detected in a number of ways. For example, an imaging approach may be used. Micelles are, by definition, not truly water-soluble and exist as dispersed liquid particles. It is therefore possible to observe corrosion inhibitor micelles by optical means. If large enough (i.e. greater than the Abbe limit of about 0.5 μm) then conventional microscopic imaging is possible and the images can be analysed using particle analysis software. Other optical means may also be used depending on the properties of the micelles.

If required, a compound capable of associating with a micelle to produce an amplified or detectable signal may be added. For example, a marker solution may be added to the fluid which creates or enhances a detectable property (e.g. fluorescence). The signal is amplified when associated with the micelle relative to the disassociated state and therefore increases the signal to noise ratio resulting in increased overall sensitivity. The alteration in signal might, for example, result from a change in the electronic environment of the marker molecule which varies the molecular dipole moment in the ground and excited states. These differences result in a relative modification of the quantised energy of light absorbed or emitted in spectroscopic processes and so can be measured experimentally, for example through absorption, transmission, fluorescence intensity, fluorescence wavelength, fluorescence polarisation or fluorescence lifetime.

Due to these changes being strongly influenced by the polarity of the surrounding matrix, measurement of the light can be a probe for chemical environment. Alternatively, the marker may only be soluble in the micelle and solubility may determine whether a signal is generated or not, in either such case the signal may be colourometric, absorbance, luminescent or fluorescent. Generally, UV and fluorescence measurements are faster than colourometric alternatives which require an extraction step.

Micelles have distinct optical properties of shape and light diffusion, diffraction and reflection which allow them to be discriminated from other particles. Smaller particles may be imaged beyond the diffraction limit using, for example, dark-field imaging and/or Brownian motion analysis.

Another method that may be used for detecting and analysing the micelles is spectral analysis (spectroscopy). In complex fluids, such as those from oilfield production, there are likely to be a number of particles arising from non-corrosion inhibitor origins which must be discriminated against in the analysis. One method of achieving this is by interrogating the analyte with light and recording the resulting spectral properties of the system. In one embodiment this may involve recording the bulk UV, visible or infrared absorption of light at a certain wavelength. The resulting absorption, either with or without the addition of a marker solution, may be indicative of the presence of micelles. Alternatively, fluorescence emission, lifetime or polarisation could be used.

In an expansion on this, spectral resolution can be combined with an imaging system so that each recorded pixel will contain spectral information rather than just intensity. For example, fluorescence imaging can be used to measure the colour of the fluorescence emission, the colour emitted in response to the presence of corrosion inhibitor being different from the colour emitted in response to the presence e.g. oil, sand or other additives. These methods can be broadly termed as spectral or hyperspectral imaging. In one embodiment, the spectrum imaged may just be a simple recording at three different wavelengths e.g. RGB, or it could include a full spectral scan across e.g. 500-900 nm.

Diffraction technologies may also be used to detect and monitor the micelles. Systems for measuring nano particles involving light scattering or diffraction techniques may be used to determine the particle size of the micelles in solution and also the properties of those particles. In its simplest form the diffraction of light resulting from suspended particles in solution can be used to determine the presence, average particle size and the relative distribution of particles in the solution. Addition of supplementary sensing technology such as interferometry, impedance and zeta potential measurements can additionally characterise the system to provide discrimination between micelles and interfering oilfield species.

Other methods for detecting and monitoring micelles formation are based on particle interrogation and counting systems. For example, flow cytometry is a method of examining and sorting microscopic particles in a fluid. These systems are built to varying specifications and record parameters including particle volume, shape, size etc. They are often also associated with fluorescence detection in microbiological studies and combine this with light scatter analysis in systems such as a Fluorescence-Activated Cell Sorter (FACS). Such a device could be modified to measure micelles and other particles in material to provide a rich pool of data. Because micelle detection requires no antibody binding step the analysis would also be much faster than traditional flow cytometry and may be amenable to offshore use.

Useful information may be obtained from monitoring micelle formation. Indeed, the concentration of micelles in the fluid is related to the degree of corrosion inhibition and efficiency of the inhibitor. In addition, analysis of the micelles (e.g. assessment of their number, size and shape) will provide information on the physico-chemical properties of the fluid.

It is pointed out that the idea of assessing the efficiency of an additive by monitoring micelles formation is not limited to corrosion inhibitors. Examples of oilfield additives that may be assessed with the present method include, but are not limited to, surfactants injected into formations to stimulate Enhanced Oil Recovery, surfactants in aphrons (which are foam-like fluids used during drilling) to decrease resistance, surfactants that are added to biocides, foamers, defoamers, asphaltene inhibitors and paraffin control agents (which are added to prevent the formation of certain precipitates), emulsifiers and demulsifiers, anti-swelling agents and hydration inhibitors for oilfield clays, mechanical lubricants, cement flow additives and anti-caking agents and scale dissolvers, cleaning agents, wetting agents and wax control agents.

The method may be applied to any chemical compound capable of forming a micelle. Upon introduction into a fluid, the compound will migrate towards its specific target to perform its specific function. Once the target is saturated with the chemical, the additional molecules will self-aggregate and internalise into micelles. Thus, once micelles formation is detected, it can be assumed that enough additive has been introduced into the fluid. Each chemical compound (and more importantly micelle produced from it) has characteristic physico-chemical properties that will allow specific micelles to be identified, monitored, detected and/or isolated for analysis.

In the present method, a fluid sample may be monitored "in-line", i.e. in situ and in real time, "at-line", "off-line" or "online. An "off-line system" allows the user to take a sample from a system, and analyse it at a later stage. Such a system is useful if the equipment for analysis is located far from the location at which the sample is taken. It can also provide the user with a method for collecting samples taken at various time points and then analysing them to produce data showing composition relative to time.

An "at-line system" allows the user to remove a sample from the system and analyse it on site. For example, the user could remove the sample with a syringe through a needle port, mix it with a detection molecule, mount on a microscope slide and analyse the signal. A portable fluorescence spectrophotometer may also be used for the detection step. This system is not real time but is rapid, and all of the equipment is portable and may be automated, making this method of testing suitable for both offshore use and onshore production operations, refining, etc.

An "online system" may be an automated monitoring system, which feeds directly into a computerised system for monitoring offsite. For example, an online system may incorporate an automated in-line system, information from the in-line system being relayed directly to the operator's computer system so that it may be reviewed by technicians at a different location. This method advantageously allows data to be recorded in real time, but the personnel required to analyse the data would not need to be on-site.

Experiment A

Use of fluorescence spectroscopy to demonstrate the differences observed in corrosion inhibitor micelles relative to an aqueous solution and the further differentiation that can be obtained by adding a marker molecule to a sample.

The instrument used was a Varian Carey Eclipse spectrofluorometer with a standard 1 cm fluorescence cuvette. Excitation was at 485 nm with 5 nm slit widths for excitation and emission. A stock solution of marker (1 μM Nile Red, Sigma) was prepared in spectroscopic grade ethanol (Fisher) and diluted ten-fold with deionised water. The fluorescence emission spectrum was weak with a maximum intensity at 655 nm.

Addition of a commercially available oilfield corrosion inhibitor (product name "EC1440A", known to have an active imidazoline-based component and to include alcohols) at a level of 500 ppm total to deionised water created a micellular dispersion with some fluorescence intensity maximised at 545 nm. To this solution, addition of Nile Red at a concentration of 100 nM created a more intensely fluorescent species with maximum at 625 nm. It is well understood to those skilled in the art that pure water is non-fluorescent at these wavelengths.

The results are shown in FIG. 1 showing fluorescence intensity and spectra from marker in water (100 nM Nile Red in 10% EtOH in $dH_2O$), corrosion inhibitor in water (500 ppm formulated CI in $dH_2O$), and corrosion inhibitor and marker in water (500 ppm formulated CI in 10% EtOH+100 nM Nile Red). Although the presence of corrosion inhibitor in water can be determined with fluorescence, addition of a marker alters the spectra and enhances the intensity of the fluorescence signal obtained.

These results indicate that corrosion inhibitor, as a micellular dispersion, can be differentiated from water using fluorescence spectra and intensity. Signal from the corrosion inhibitor was altered, in terms of spectral wavelength response and increased intensity, by addition of a marker that generates a fluorescence signal on association with micelles.

Experiment B

Use of fluorescence spectroscopy to demonstrate the differences observed in corrosion inhibitor micelles using different concentrations of different amphiphilic chemicals.

Three amphiphilic chemicals belonging to different chemical classes were used to determine the fluorescent response of a marker molecule over a range of concentrations. The three chemicals were hexadecyltrimethyl-ammonium bromide (commonly known as cetrimonium bromide), glycolic acid ethoxylate oleyl ether and cetylpyridium bromide hydrate. Concentrated solutions of each were prepared in water (1%, 2% and 1%, respectively) and serial dilutions of each were performed in to water so that 1000, 100, 10, 1 and 0.1 ppm samples were also available. Each sample was analysed using the same method.

The same equipment as that used in Experiment A was used to collect fluorescence emission spectra, however, an excitation wavelength of 530 nm was used. To each test sample, 3 μL of 1 mM Nile Red (Sigma) in spectroscopic grade ethanol (Fisher) was added and mixed to provide a final marker concentration of 1 μM.

Figure 2:
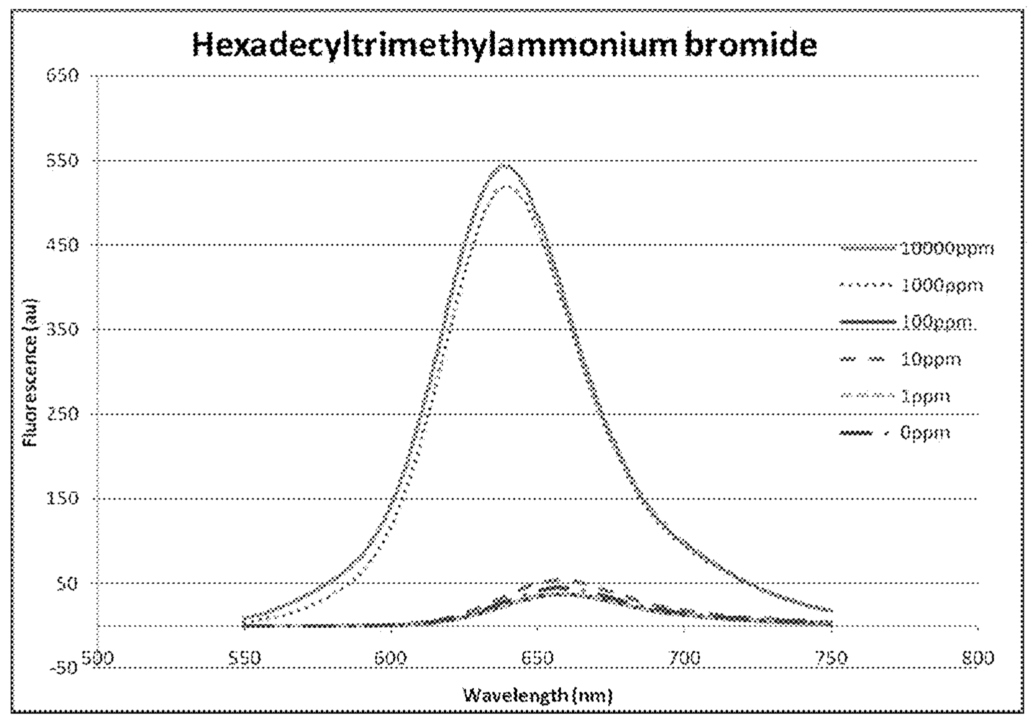
FIG. 2 shows fluorescence emission spectra of a concentration series of aqueous solutions of hexadecyltrimethylammonium bromide with Nile Red.
Figure 3:
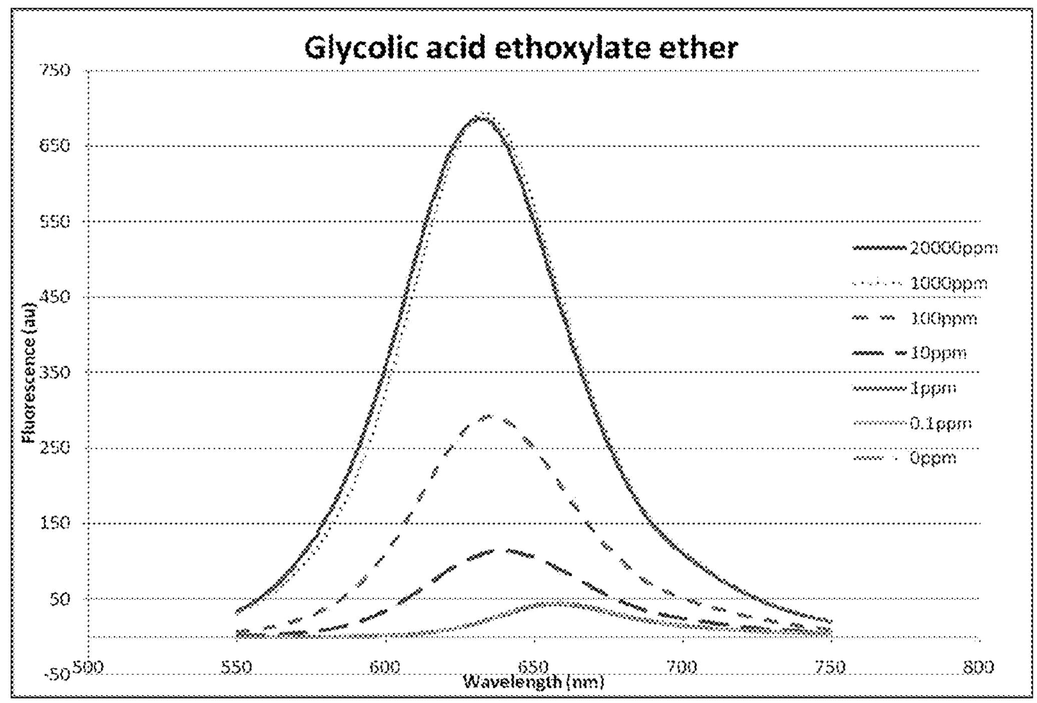
FIG. 3 shows fluorescence emission spectra of a concentration series of aqueous solutions of glycolic acid ethoxylate oleyl ether with Nile Red.
Figure 4:
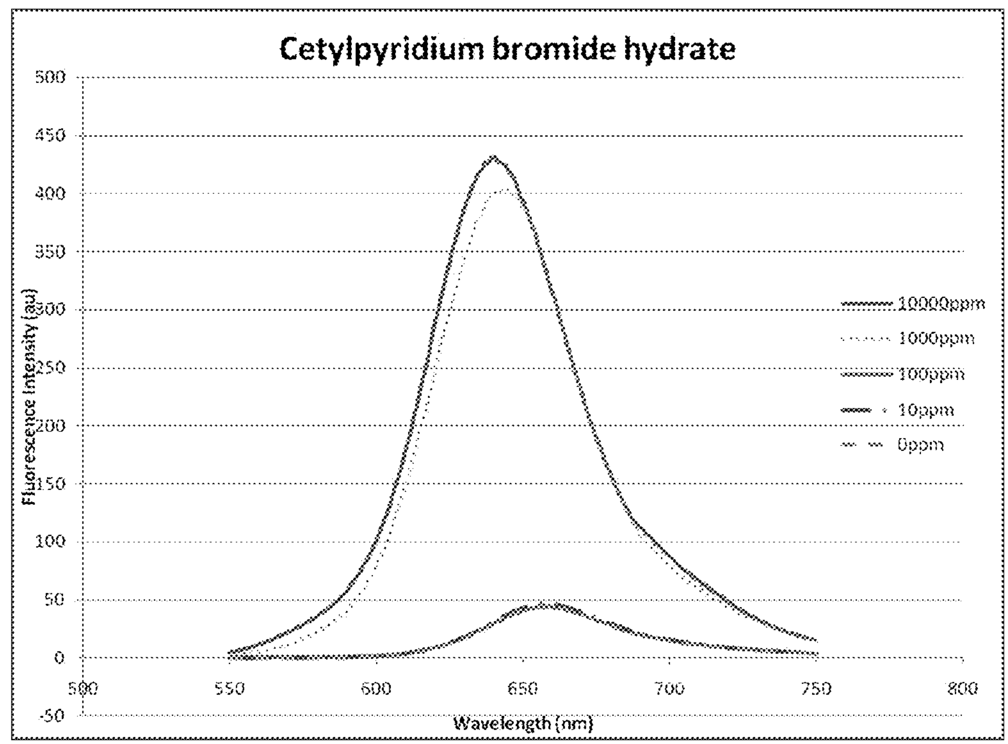
FIG. 4 shows fluorescence emission spectra of a concentration series of aqueous solutions of cetylpyridium bromide hydrate with Nile Red.
Figure 5:
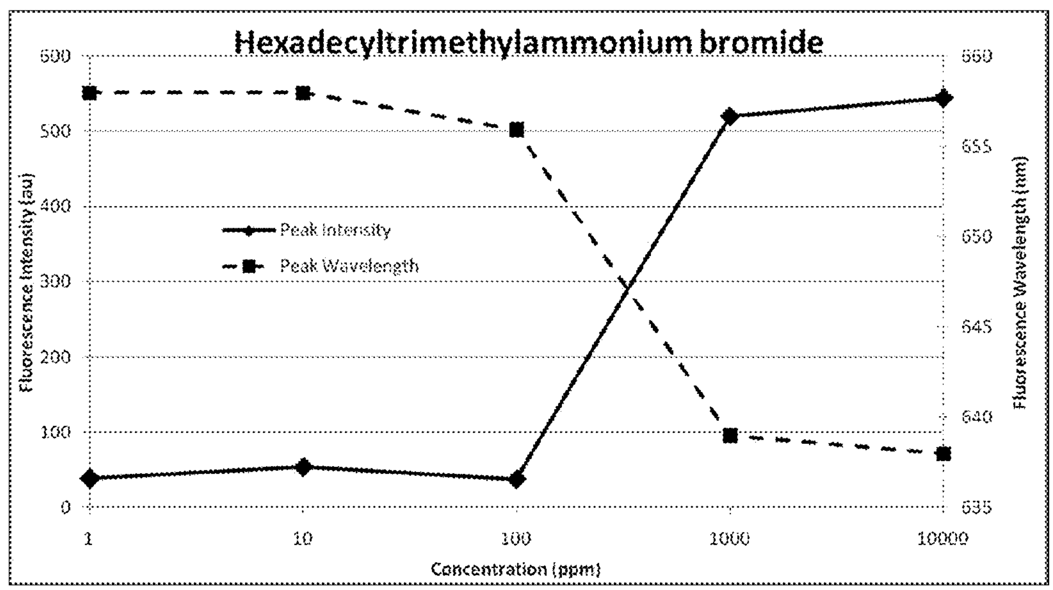
FIG. 5 is a plot of peak fluorescence emission intensities and wavelengths versus chemical concentration for the samples shown in FIG. 2.
Figure 6:
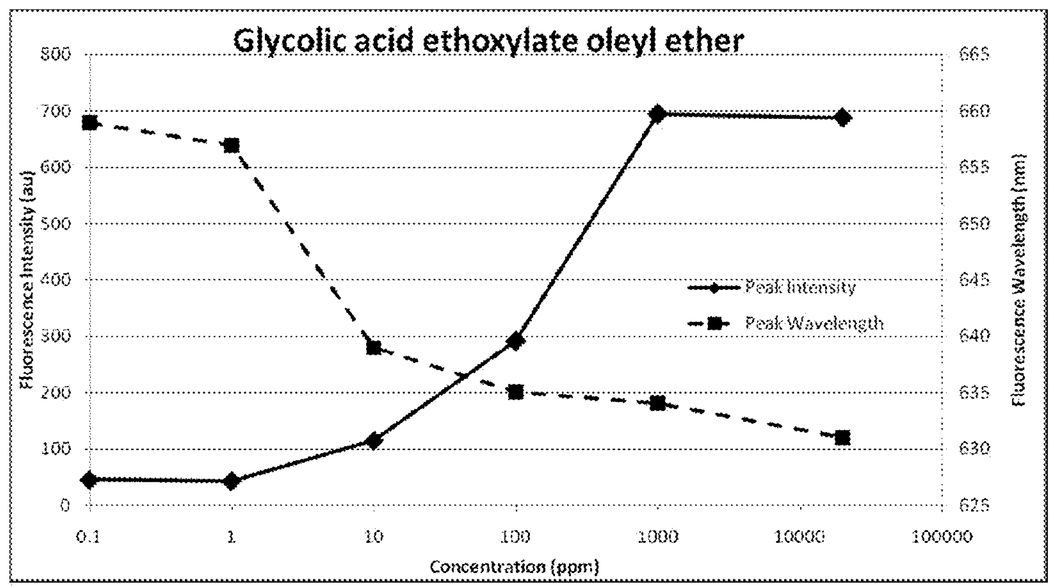
FIG. 6 is a plot of peak fluorescence emission intensities and wavelengths versus chemical concentration for the samples shown in FIG. 3.
Figure 7:
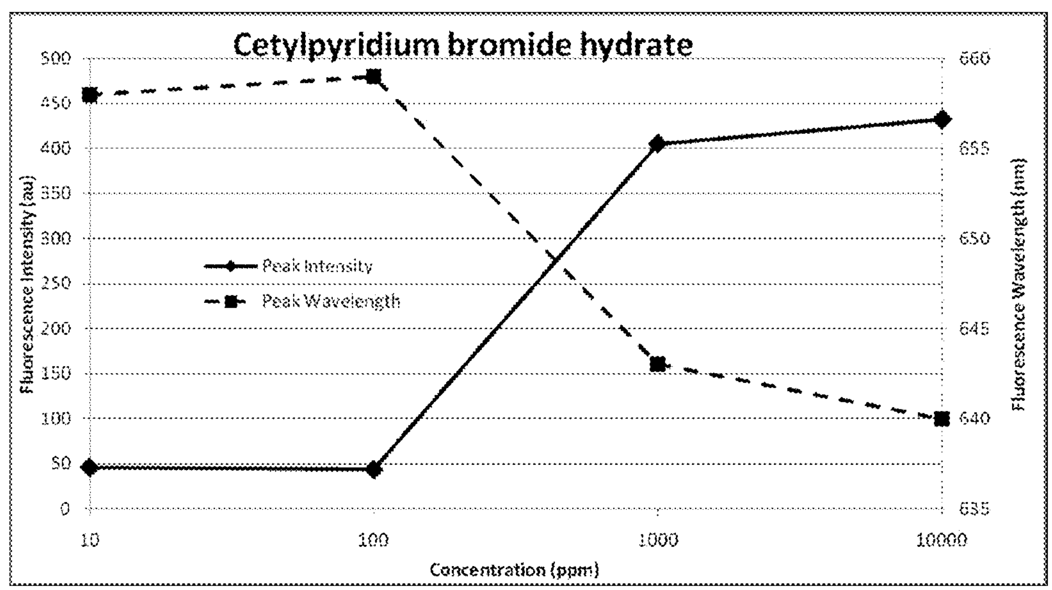
FIG. 7 is a plot of peak fluorescence emission intensities and wavelengths versus chemical concentration for the samples shown in FIG. 4.

The data were processed by subtracting the intensity of the chemical alone from the intensity of the chemical and dye mixture to provide a spectrum depicting the intensity related to the addition of the marker. The spectra for each concentration tested for each of the three chemicals are shown in FIG. 2 (hexadecyltrimethylammonium bromide), FIG. 3 (glycolic acid ethoxylate oleyl ether) and FIG. 4 (cetylpyridium bromide hydrate). It can be seen that, in general, those samples prepared at the highest concentrations have higher fluorescence intensity and a lower peak fluorescence wavelength than those at the lowest concentrations. This is shown graphically in FIG. 5 (hexadecyltrimethylammonium bromide), FIG. 6 (glycolic acid ethoxylate oleyl ether) and FIG. 7 (cetylpyridium bromide hydrate).

Figure 8:
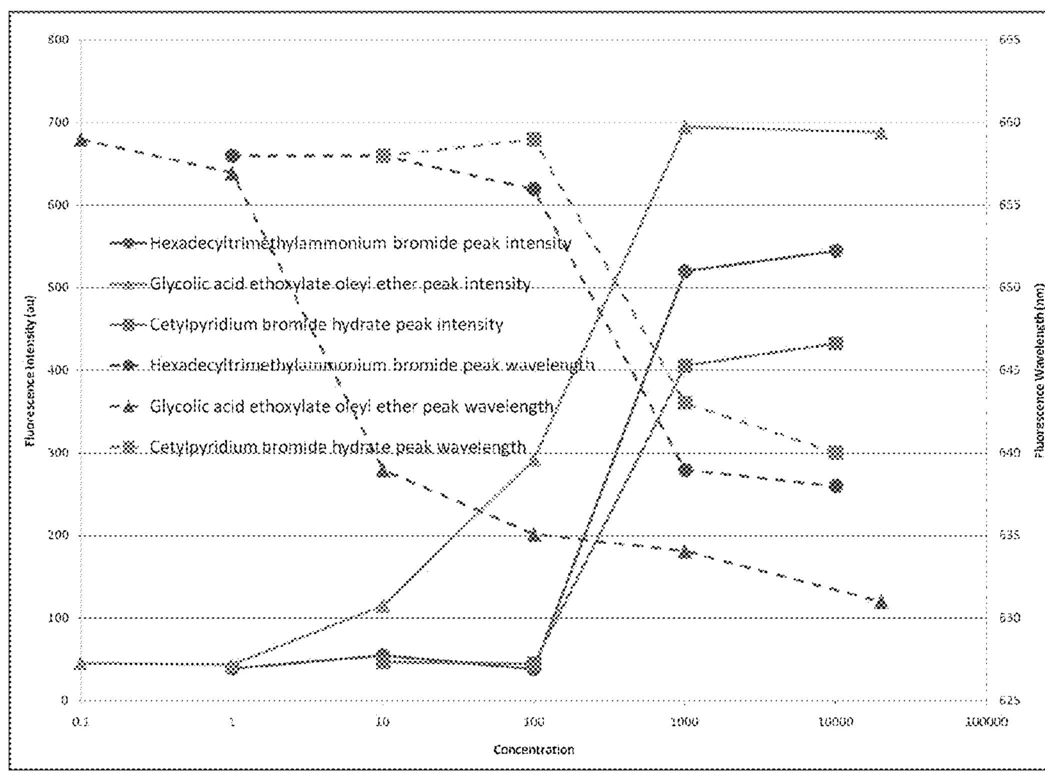
FIG. 8 is a comparison of the peak intensities and wavelengths of the fluorescence emission spectra of a concentration range of aqueous solutions of three different surfactant chemicals with Nile Red.

The trend in fluorescence intensity and peak wavelength is seen to vary with concentration for all three samples. The trend is similar with a step-change being observed rather than a gradual change. The concentration range over which this change occurs and the absolute fluorescence intensities and peak wavelengths are different for each of the chemicals and so the utility of this method for discriminating and diagnosing the presence of different chemicals can be seen. The Nile Red fluorescence is strongly affected by the dielectric field and so the intensity and wavelength can be used to imply the local environment of the dye, such as the ionic strength of the aqueous phase or the size or shape of chemical micelles. The difference in the response of the three chemicals is highlighted in FIG. 8, which shows that the change in fluorescence intensity and wavelength corresponds to the formation of micelles in solutions at that concentration and that peak wavelength and intensity can be used to estimate the concentration and nature of the micelles.

Experiment C

Use of fluorescence spectroscopy and other physical measurements to detect corrosion inhibitor micelles in multi-phase field fluids.

The corrosion inhibitor used was a proprietary composition, known to be film-forming, i.e. surfactant in nature. The corrosion inhibitor ("RU-276") was known to have more than one active component, one of which was known to be imidazoline-based. The multi-phase fluid comprised a synthetic field brine and complementary oil from the same field. The oil was a black oil with API ~21° and was present at 10% of the total fluid volume to simulate a production facility with high water cut where corrosion control is important.

Samples of this multiphase fluid with different corrosion inhibitor concentrations were prepared by adding various amount of the inhibitor to the aqueous phase of the fluids. The samples were mixed on a horizontal rotary shaker for 20 minutes and allowed to settle for a minimum of four hours. Some of the samples formed an emulsion which did not separate by gravity alone so, where necessary, the samples were centrifuged at 1000 g for 25 minutes to induce phase separation. The aqueous phase was removed from the sample and analysed by fluorescence spectroscopy.

The instrument used was a Shimadzu spectrofluorometer with a standard 1 cm fluorescence cuvette. Excitation was at 530 nm with 5 nm slit widths for excitation and emission. To each 2.5 mL test sample, 10 μL of marker (1 mM Nile Red, Sigma) was prepared in spectroscopic grade methanol (Fisher) and mixed to provide a final marker concentration of 4 μM.

Figure 9:
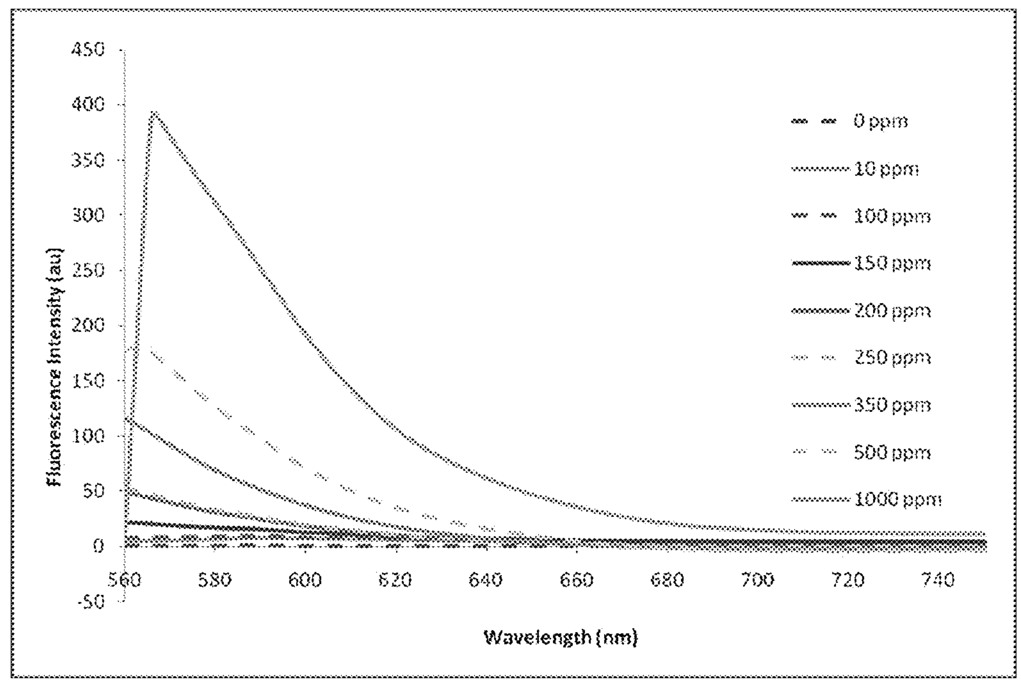
FIG. 9 is an overlay of fluorescence emission spectra from the aqueous phase of simulated oilfield samples with varied concentrations of corrosion inhibitor.
Figure 10:
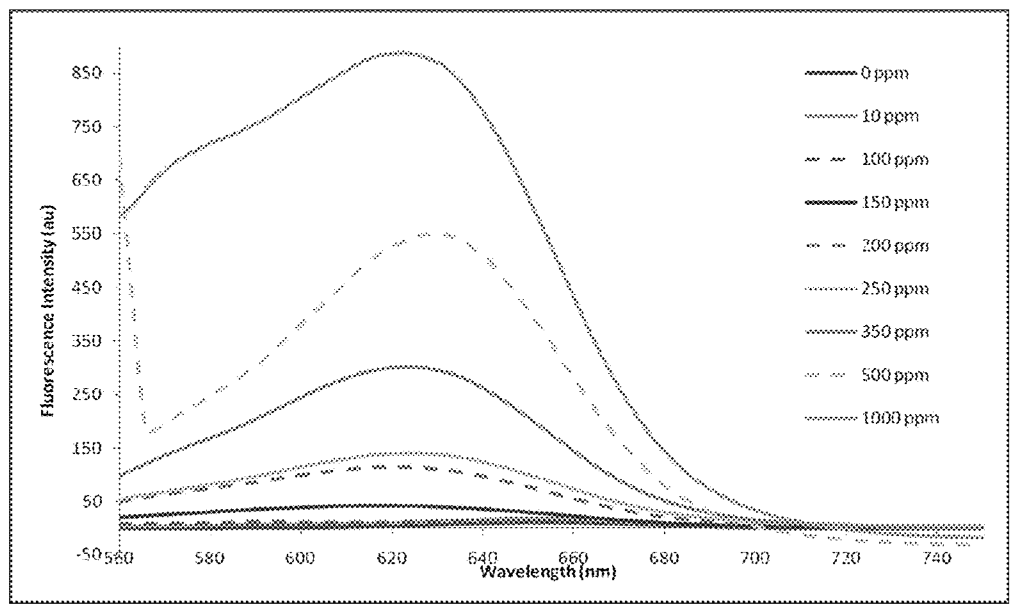
FIG. 10 is an overlay of fluorescence emission spectra from the same samples as those analysed in FIG. 9, after addition of Nile Red.
Figure 11:
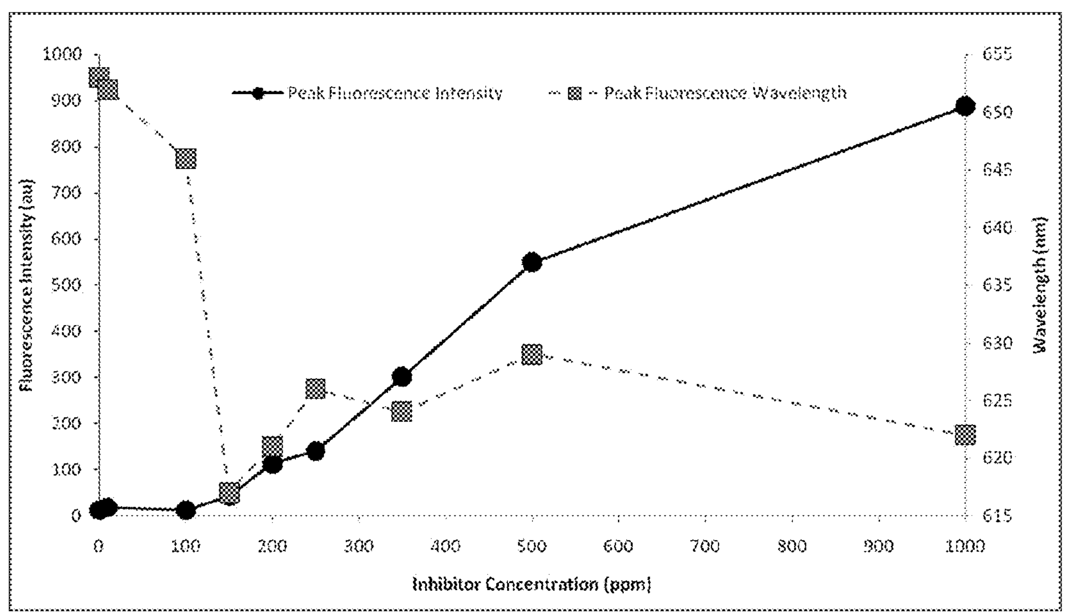
FIG. 11 is a plot of the peak fluorescence emission intensities and wavelengths from the fluorescence emission spectra shown in FIG. 10.

The fluorescence emission spectra are shown in FIGS. 9 and 10, and show that there is significant amount of light scatter in the samples, particularly at higher concentrations. This is probably indicative of the micro-emulsions that can form between oil and water and can often be stabilised by the presence of surfactants. Addition of the dye can be seen to result in a much higher fluorescence intensity and a change in spectral profile to reflect true fluorescence emission rather than light scatter. In the sample with highest oil concentration, black oil could be seen dispersed in solution and this is reflected by the contribution to the spectrum at 570-580 nm. This spectrum also shows how the signal due to the oil can be discriminated from the signal due to the corrosion inhibitor components due to the solvatochromic nature of the Nile Red dye—the corrosion inhibitor fluoresces with ~50-60 nm higher peak wavelength. A summary of the peak intensities and wavelengths is shown in FIG. 11 and suggests that micelle formation commences at a concentration between 100 and 150 ppm indicating that the critical micelle concentration lies within this range. The increase in intensity with concentrations around 150-400 ppm does not show the steady increase observed elsewhere and this may reflect the reorganisation of micellular structures due to the different components in the formulation.

The same brine-phase samples containing various surfactant type corrosion inhibitor were also analysed using two physical techniques—interfacial tension measurements and particle size analysis. These techniques measure different aspects of the fluids related to micelle formation and were performed to validate and correlate the physical phenomenon detected using fluorescence spectroscopy.

Figure 12:
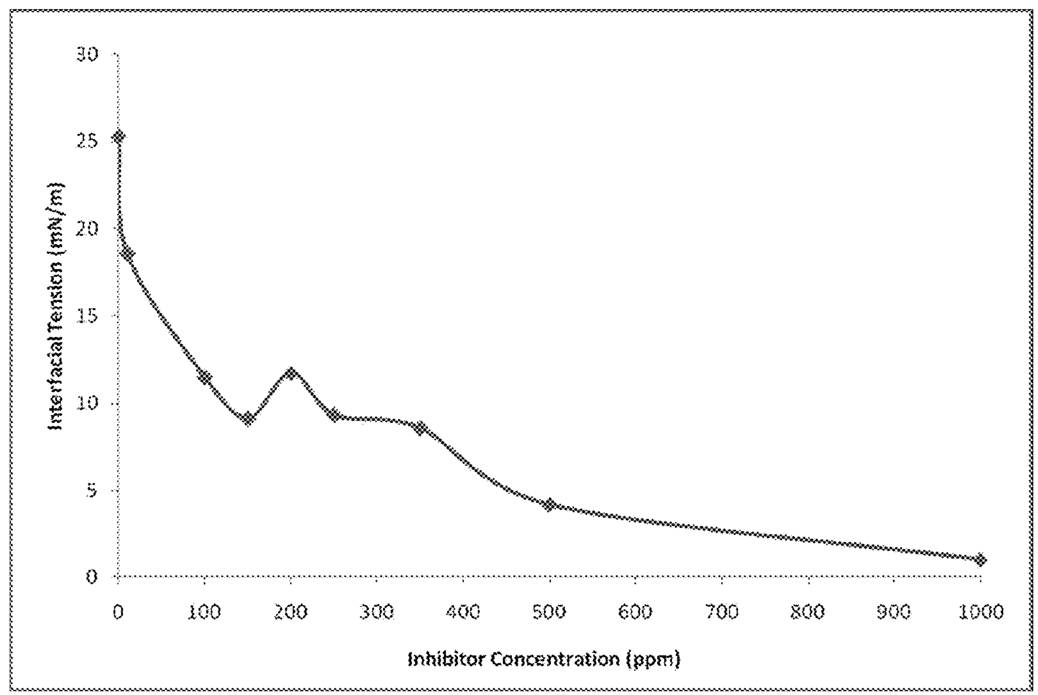
FIG. 12 is a plot of the interfacial tension between an oil droplet and the bulk aqueous phase of simulated oilfield samples with varied concentrations of corrosion inhibitor.

Interfacial Tension (IFT) values were calculated automatically by the pendant drop method using a Dataphysics OCA system. This is an optical method, therefore it was important for the aqueous solutions to be optically clear so that background contrast could be optimised. It was found that some solutions had too many dispersed oil droplets to allow the software to make calculations and so the aqueous phase was filtered through a 0.22 μm cellulose acetate syringe filter. This was the case for samples at 150 ppm corrosion inhibitor and higher. Oil drops were injected and measured every 5 seconds over 5 minutes and the mean IFT value was calculated. Five replicate experiments were performed for each sample. The interfacial tension between the oil and the aqueous phases was observed to change with concentration of corrosion inhibitor and is shown in FIG. 12. The plot does not display a defined plateau and plotting on a logarithmic scale does not show any well defined breakpoint that is usually observed when studying surfactant behaviour in this way. However, it is clear that the changes in interfacial tension do correlate with changes in the fluorescence intensity and, in particular, there is a decrease in the rate of change of the interfacial tension at 150 ppm, where the fluorescence method suggested that the formation of micelles occurs.

Figure 13:
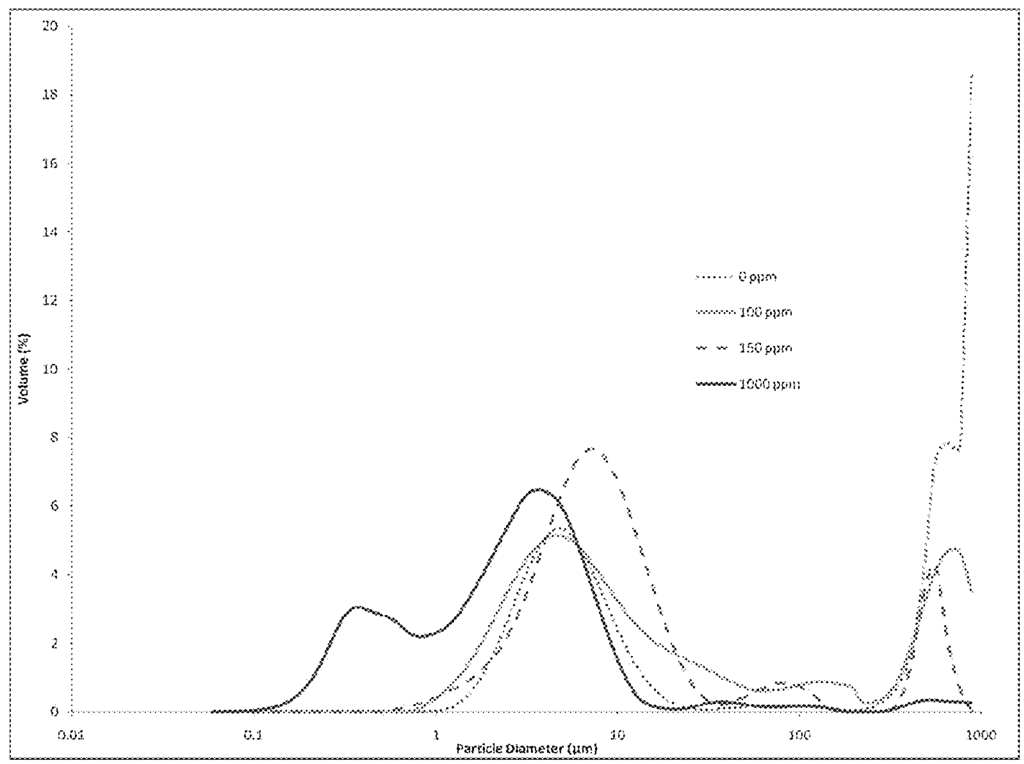
FIG. 13 is a plot of percentage of total particle volume as a function of particle diameter for the aqueous phase of simulated oilfield samples with varied concentrations of corrosion inhibitor.

Particle size analysis of the aqueous phase was performed by introducing the samples into the sample cell of the particle size analyser (Malvern Mastersizer) and the results are shown in FIG. 13, expressed as the % of total volume of particles as a function of particle size. This scale is an important aspect to consider when interpreting the data, as a small number of particles of large particle size may appear to be more abundant than they actually are because they will occupy a volume equal to many more smaller particles. With no corrosion inhibitor present there appear to be two significant particle distributions—one at ~6 μm diameter and a distribution of large particles, presumably particles of dispersed oil in the aqueous phase. Upon addition of corrosion inhibitor this larger distribution of particles is immediately reduced. This is consistent with the reduction in interfacial tension observed and with the theoretical mode of action of surfactant molecules which partition across phase interfaces and increase the energetic favourability, and therefore stability, of smaller droplets. The mean diameter of the smaller distribution also appears to have been fractionally reduced at 100 ppm inhibitor concentration. Upon addition of further inhibitor at 150 ppm, the larger droplets are further reduced in size and % volume, consistent with surfactant-aided solubilisation of oil micro-droplets. The relative % volume of the smaller distribution was seen to increase, as was the mean diameter—this may be related to a restructuring of micro-particles due to the multi-component system used in this inhibitor package and is also consistent with the results of the fluorescence and interfacial tension studies where a change in behaviour of the inhibitor was observed at these concentrations. At 1000 ppm corrosion inhibitor the larger particles are almost completely dispersed into smaller droplets and there is a significant distribution on the nanometer scale which is consistent with the presence of corrosion inhibitor micelles.

Experiment D

Visualisation of micelles using a scattering technique, e.g. dark field microscopy.

Micelles were visualised using conventional optical microscopy and epifluorescence microscopy using a Nikon Optiphot microscope. Deionised water was placed on a microscope slide without coverslip and imaged using a Nikon Coolpix 4500 digital camera. Because the size range of micelles can include very small particles (<100 nm), optical microscopy was performed with a dark field filter in place so that only scattering particles were observed as light intensity. Addition of 2 μL of an unformulated commercial corrosion inhibitor ("Imidazoline NH", Lakeland Laboratories Ltd, known to include a quaternary amine active component) to a 50 μL drop of deionised water resulted in a solution containing a very large number of scattering droplets which were mixtures of conventional micelles and larger aggregates of micelles in complex three dimensional structures.

Figure 14:
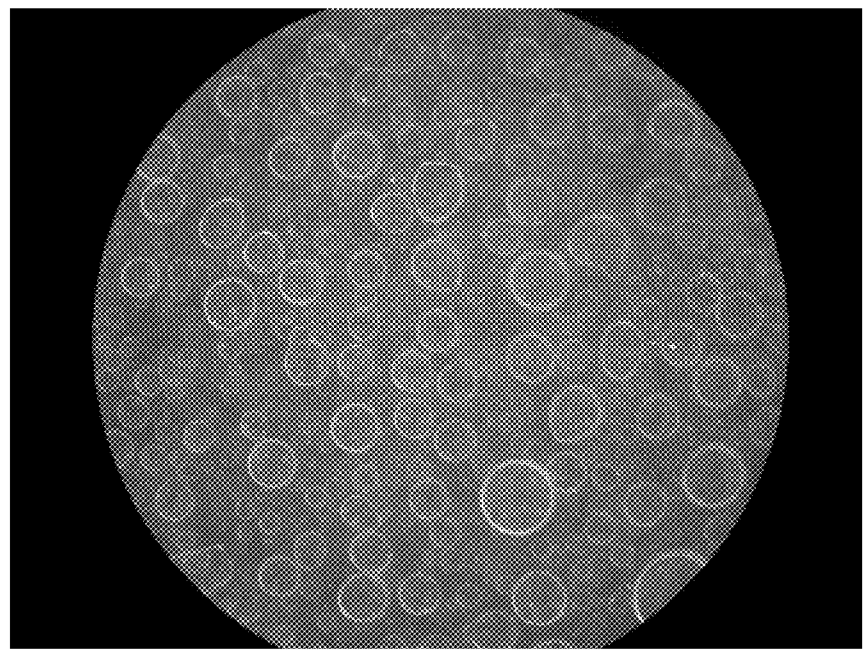
FIGS. 14 and 15 are dark field microscopy images of corrosion inhibitor micelles in water.
Figure 15:
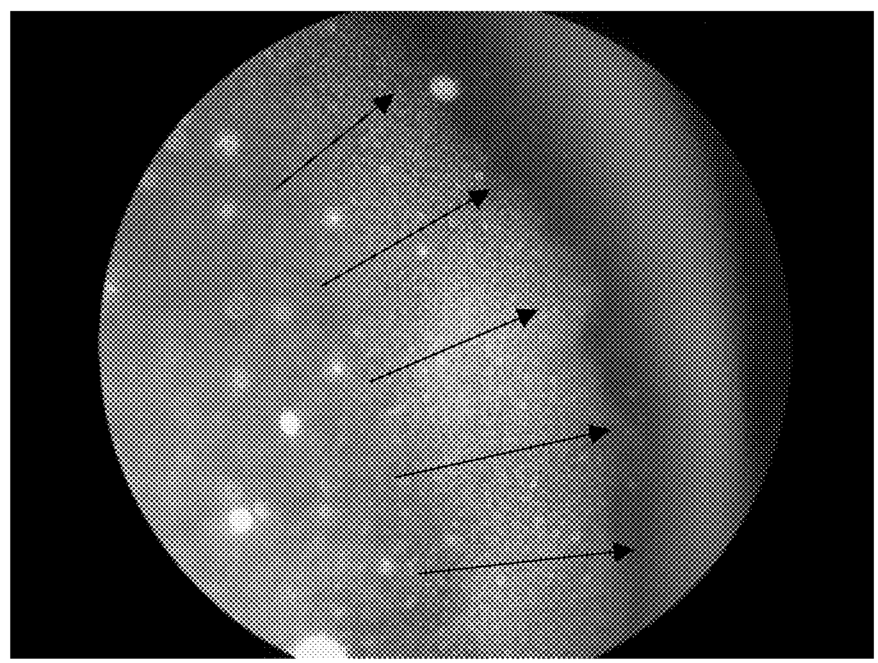

FIG. 14 shows a dark field microscopy image (100× magnification) of coalesced micelles which formed at the top (air) surface of a water droplet. FIG. 15 shows a dark field microscopy image (100× magnification) of micelles ranging in size and progressing towards the edge of the water droplet at the extreme right hand side of this image (below focal plane; direction of arrows). Smaller micelles were observed to move rapidly to the air water interface with larger micelles (seen above focal plane) moving more slowly.

Figure 16A:
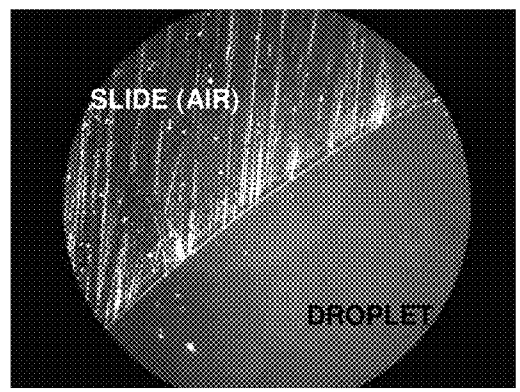
FIGS. 16A and 16B are dark field microscopy images showing corrosion inhibitor accumulating at the water-air interface.
Figure 16B:
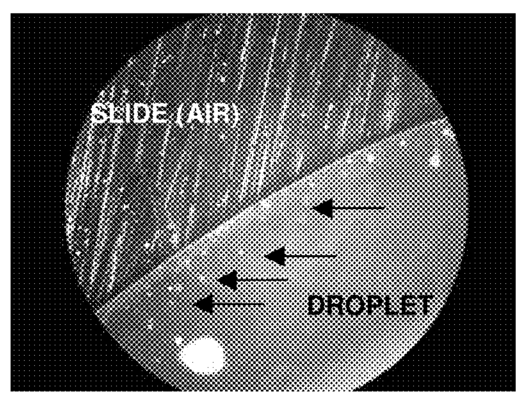

A one hundred fold dilution of the same corrosion inhibitor in water provided a more dilute solution but one which was still observed to contain micelles. Due to the lower concentration used the particle size range of micelles was lower than observed for the previous highly concentrated sample. Micelles could be observed accumulating at the water-air interface as can be seen on FIG. 16. FIG. 16*a* and 16*b* shows a dark field microscopy image (200× magnification) of the edge of (a) a water droplet or (b) the same water droplet after addition of 2 mL of 100× dilution of corrosion inhibitor solution. Scattering micellular particles are observed to have moved towards the air interface (indicated by arrows).

This example demonstrates that corrosion inhibitor micelles form in water and can be observed with dark field imaging. In water and under static conditions, micelles were seen to travel to the edge of the air-water interface.

Experiment E

Visualisation of micelles using epifluorescence microscopy.

Use of an epifluorescence microscope showed the presence or absence of areas of fluorescence extremely well but, because such a system relies on a gating technique to allow transmission of light of a certain wavelength window, useful spectral resolution is effectively lost.

Figure 17:
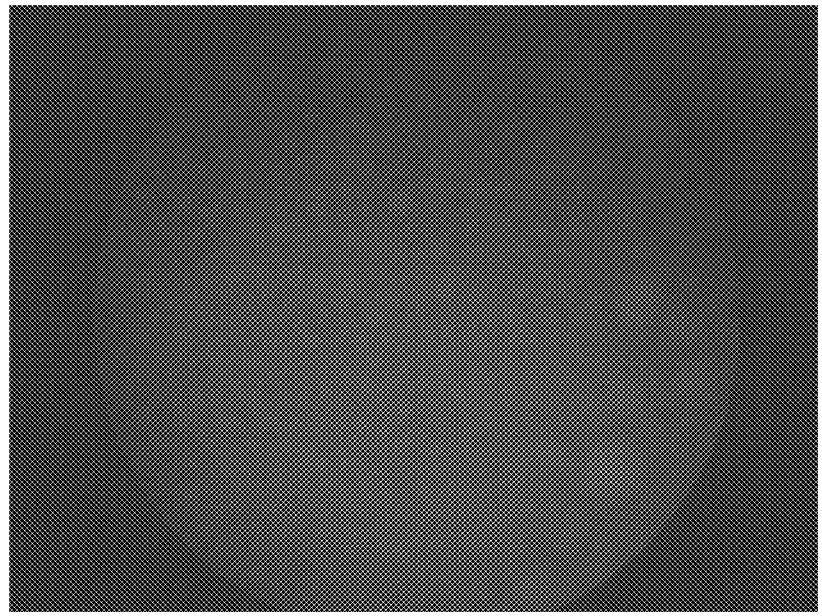
FIG. 17 is a fluorescence microscopy image of a concentrated corrosion inhibitor solution as aggregated micelles in solution.

A Nikon® Optiphot microscope and Nikon Coolpix 4500 digital camera were used and fluorescence was recorded through an excitation filter of 560±30 nm and emission of 630±30 nm with a high pressure mercury lamp light source. Corrosion inhibitor micelles have intrinsic fluorescence and at ~40 000 ppm (bulk) in water could be observed as aggregated micelles using fluorescence microscopy. FIG. 17 shows a concentrated solution of the EC1440A corrosion inhibitor solution (~40000 ppm bulk) as aggregated micelles in solution. This fluorescence microscopy image (100×) shows that the micelles have intrinsic fluorescence without any marker molecule.

Figure 18:
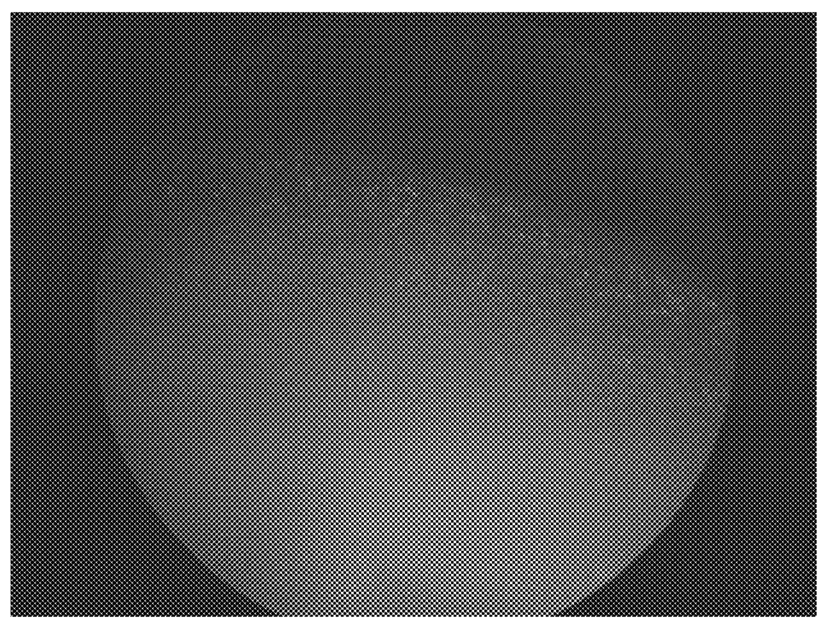
FIG. 18 is a fluorescence microscopy image of a concentrated corrosion inhibitor solution with 40 nM Nile Red at the air water interface.

Imaging was improved, in terms of resolution of micelles and signal enhancement through addition of a marker (40 nM Nile Red) which associated with the micelles. FIG. 18 shows a concentrated (~40 000 ppm bulk) EC1440A corrosion inhibitor solution with 40 nM Nile Red at the air water interface. The addition of the marker increases fluorescence intensity from the micelles and allows imaging of smaller sizes. Thus, fluorescence imaging of corrosion micelles and agglomerates can be enhanced through addition of a marker that associates with micelles and generates fluorescence signal on such an association, thereby increasing signal strength and improving resolution so that smaller droplets may be imaged.

Figure 19A:
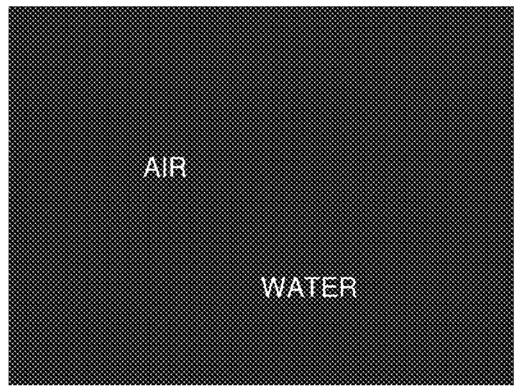
FIG. 19A is an epifluorescence microscopy image of a drop of deionised water.

A 50 μL drop of deionised water was observed to have negligible fluorescent intensity (see FIG. 19A). Addition of 2 μL of 1 μM Nile Red in ethanol to the drop gave the entire drop some diffuse fluorescent intensity (see FIG. 19B). Addition of a small amount (1 μL) of the EC1440A corrosion inhibitor to the droplet showed micelles accumulating at the air-water interface and with fluorescence microscopy these were observed as a band of fluorescence (see FIG. 19C). Whilst obvious by eye, these images have undergone contrast enhancement using proprietary software.

Figure 19B:
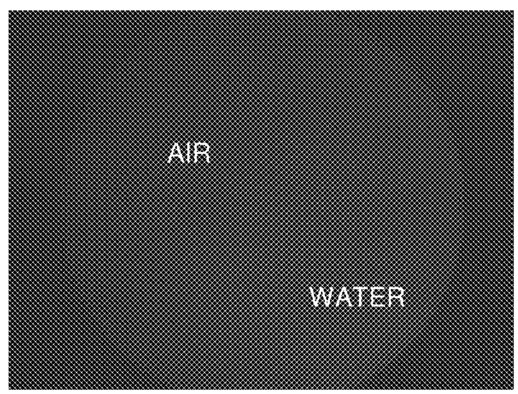
FIG. 19B is an epifluorescence microscopy image of 40 nM Nile Red in deionised water.
Figure 19C:
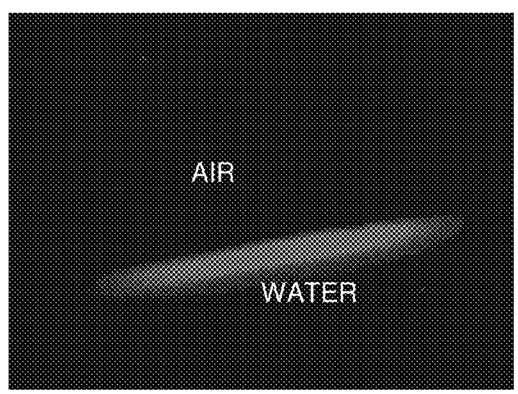
FIG. 19C is an epifluorescence microscopy image of a dilute micelle dispersion.

FIGS. 19A to 19C shows that corrosion inhibitor at the water-air interface can clearly be observed as a dense area of fluorescence at 200× magnification when using a marker that associates with corrosion inhibitor. FIGS. 19A to 19C show an epifluorescence microscopy image (200× magnification) of (a) a drop of deionised water showing negligible fluorescence, (b) 40 nM Nile Red in deionised water imaged by epifluorescence microscopy; the fluid has limited diffuse fluoresce intensity evenly across the image, and (c) a dilute micelle dispersion (~50 ppm bulk) accumulating at the air-water interface at the edge of a water drop; note the band of fluorescence observed.

Results indicate that fluorescence imaging can be used to identify corrosion micelles. Addition of a marker that associates with micelle to generate a fluorescent signal can aid in imaging smaller micelles and offers a method for improving imaging.

The invention claimed is:

1. A method of inhibiting the corrosion in a fluid conducting and containment system used to screen, test, produce and process oil and gas, and their products, the method comprising the steps of:

a) selecting a fluid conducting and containment system, used to screen, test, produce and process oil and gas, and their products, to be treated;

b) adding a corrosion inhibitor comprising at least one amphiphilic chemical to the fluid in the system;

c) (i) sampling the fluid at-line, online or off-line and adding a marker solution containing a marker which can emit an optically detectable signal to the sample; or (ii) adding a marker solution containing a marker which can emit an optically detectable signal to the fluid and sampling the fluid at-line, off-line or online;

d) measuring micelles in the fluid by detecting the optically detectable signal emitted from the fluid; and e) optimizing the further addition of corrosion inhibitor once micelles are detected in the fluid, in order to maintain an effective concentration to maximize protection and minimize the overuse of the inhibitor, by continuing to monitor for the presence of micelles in the fluid.

2. The method of claim 1, wherein if the concentration of active surfactant components of corrosion inhibitor is below its effective concentration, additional corrosion inhibitor is added to the fluid within the conducting and containment system used to screen, test, produce and process oil and gas, and their products until the monitored micelles indicate that the effective concentration has been obtained.

3. The method of claim 1, wherein the at least one amphiphilic chemical is an amphiphilic surfactant.

4. The method according to claim 3, wherein the surfactant is anionic, cationic, non-ionic or amphoteric.

5. The method according to claim 3, wherein the surfactant is a compound selected from imidazoline compounds, phosphonate compounds, alkyl pyridine compounds, quaternary amine compounds, ethoxylated amine compounds, amide compounds, propionate compounds, anhydride compounds and derivatives thereof.

6. The method according to claim 1, wherein the fluid comprises one or more of water, oil, solids, gas, liquefied gas and/or emulsions.

7. The method according to claim 6, wherein measuring micelles in the fluid comprises monitoring micelles formation in water.

8. The method according to claim 6, wherein measuring micelles in the fluid comprises monitoring reverse micelles formation in oil.

9. The method according to claim 1, further comprising the step of adding a compound capable of associating with a micelle to produce an amplified signal.

10. The method of claim 1, wherein the fluid is provided from a system comprising;

a first conduit adapted for fluid flow therein, and a second conduit in fluid communication with the first conduit, said second conduit being arranged so that a sample from the fluid may be extracted therefrom.

11. The method of claim 1, wherein micelle formation is measured using optical means.

12. The method according to claim 11, wherein micelles formation is measured using laser diffraction, interferometry or imaging, spectroscopic means, hyperspectral imaging or flow cytometry.

13. A method of inhibiting the corrosion in a fluid conducting and containment system used to screen, test, produce and process oil and gas, and their products, the method comprising the steps of:

a) selecting a fluid conducting and containment system, used to screen, test, produce and process oil and gas, and their products, to be treated;

b) adding a corrosion inhibitor comprising at least one amphiphilic chemical to the fluid in the system;

c) (i) sampling the fluid at-line, online or off-line and adding a marker solution containing a marker which can emit an optically detectable signal to the sampling; or (ii) adding a marker solution containing a marker which can emit an optically detectable signal to the fluid and sampling the fluid at-line, off-line or online;

d) measuring micelles in the fluid by detecting the optically detectable signal emitted from the fluid, wherein the optically detectable signal is detected using one of a selection of laser diffraction, interferometry or imaging, spectroscopic means, hyperspectral imaging or flow cytometry, and e) optimizing the further addition of corrosion inhibitor once micelles are detected in the fluid, in order to maintain an effective concentration to maximize protection and minimize the overuse of the inhibitor, by continuing to monitor for the presence of micelles in the fluid.

14. The method of claim 13, wherein if the concentration of active surfactant components of corrosion inhibitor is below its effective concentration, additional corrosion inhibitor is added to the fluid within the conducting and containment system used to screen, test, produce and process oil and gas, and their products until the monitored micelles indicate that the effective concentration has been obtained.

15. The method of claim 13, wherein the at least one amphiphilic chemical is an amphiphilic surfactant.

16. The method according to claim 15, wherein the surfactant is anionic, cationic, non-ionic or amphoteric.

17. The method according to claim 15, wherein the surfactant is a compound selected from imidazoline compounds, phosphonate compounds, alkyl pyridine compounds, quaternary amine compounds, ethoxylated amine compounds, amide compounds, propionate compounds, anhydride compounds and derivatives thereof.

18. The method of claim 13, wherein the fluid comprises one or more of water, oil, solids, gas, liquefied gas and/or emulsions.

19. The method according to claim 18, wherein measuring micelles in the fluid comprises monitoring micelles formation in water.

20. The method according to claim 18, wherein measuring micelles in the fluid comprises monitoring reverse micelles formation in oil.

21. The method of claim 13, further comprising the step of adding a compound capable of associating with a micelle to produce an amplified signal.

22. The method of claim 13, wherein the fluid is provided from a system comprising;

a first conduit adapted for fluid flow therein, and a second conduit in fluid communication with the first conduit, said second conduit being arranged so that a sample from the fluid may be extracted therefrom.

* * * * *